United States Patent
Stein Von Kamiensky et al.

(10) Patent No.: US 6,932,993 B2
(45) Date of Patent: Aug. 23, 2005

(54) METHOD FOR PRODUCING FILLED FOODSTUFF HOLLOW BODIES

(75) Inventors: Botho Stein Von Kamiensky, Verden-walle (DE); Siegfried Schmidt, Verden-eitze (DE); Bruno Trachez, Dorverden (DE)

(73) Assignee: Mars, Inc., McLean, VA (US)

( * ) Notice: Subject to any disclaimer, the term of this patent is extended or adjusted under 35 U.S.C. 154(b) by 0 days.

(21) Appl. No.: 10/168,734

(22) PCT Filed: Dec. 15, 2000

(86) PCT No.: PCT/DE00/04524

§ 371 (c)(1),
(2), (4) Date: Sep. 16, 2002

(87) PCT Pub. No.: WO01/47378

PCT Pub. Date: Jul. 5, 2001

(65) Prior Publication Data

US 2003/0049355 A1 Mar. 13, 2003

(30) Foreign Application Priority Data

Dec. 24, 1999 (DE) .......................... 199 62 866

(51) Int. Cl.⁷ .............................. A23L 1/00
(52) U.S. Cl. .................. 426/89; 426/279; 426/281; 426/282; 426/284
(58) Field of Search .................. 426/89, 279, 282, 426/284, 281, 283

(56) References Cited

U.S. PATENT DOCUMENTS 4,971,820 A * 11/1990 Likuski et al. .............. 426/281

5,716,655 A * 2/1998 Hamstra et al. .............. 426/63
6,517,903 B1 * 2/2003 Schmidt ...................... 427/294

FOREIGN PATENT DOCUMENTS

| DE | 29 33 261 A1 | 2/1981 |
| EP | 0 941 665 A1 | 12/1997 |
| EP | 027 522 A1 | 7/1999 |
| GB | 2324 701 A1 | 11/1998 |
| WO | PC-PCT/NO96/00008 A1 | 7/1996 |
| WO | PC-PCT/CH96/00265 A1 | 1/1998 |
| WO | IB-PCT/DE99/03973 A1 | 6/2000 |

OTHER PUBLICATIONS

Barrett, A. H. and Ross, E. W.; Correlation of Extrudate Infusibility with Bulk Properties using Image Analysis; J. Food Sci. 55(5) 1378–1382; 1990.

* cited by examiner

Primary Examiner—Lien Tran
(74) Attorney, Agent, or Firm—Fulbright & Jaworski LLP

(57) ABSTRACT

Process for the production of filled food hollow mouldings, in which each hollow moulding has at least one cavity, which is open to the environment and filled with a filling material solid at ambient temperature and having a cross-sectional dimension between approximately 0.25 mm² and approximately 1 cm², characterized in that in a first stage the hollow mouldings are coated at reduced pressure with the filling material, a filing material coating temperature being set in such a way that the filling material is flowable and in which in a second step the pressure is raised, so that the flowable coating material enters the cavities.

19 Claims, 2 Drawing Sheets

METHOD FOR PRODUCING FILLED FOODSTUFF HOLLOW BODIES

CROSS-REFERENCE TO RELATED APPLICATIONS

This application is a national stage application of PCT/DE00/04524 filed Dec. 12, 2000 claiming priority to DE 19962866.1 filed Dec. 24, 1999.

TECHNICAL FIELD

The invention relates to a process for the production of filled food hollow mouldings, in which each hollow moulding has at least one cavity filled with a filling material solid at ambient temperature and open to the environment and having a cross-sectional dimension between approximately 0.25 mm$^2$ and approximately 1 cm$^2$.

BACKGROUND OF THE INVENTION

Processes for the production of filled food hollow mouldings and processes for the filling of prefabricated hollow mouldings are known. In a first process working takes place with two parallel extrusion strands or lines of different materials and the resulting extrudate is cut after extrusion into small, compact pieces giving food composites having in an outer area a carrier material and in a cavity or several cavities distributed over the carrier material and which in the finished state are open to the outside, a filling material. In another process initially e.g. by extrusion food hollow mouldings are produced, e.g. in the form of small hollow cylinders, which can be closed in an end portion, the hollow moulding subsequently being filled with a filling material and the or each cavity is stripped at its mouth or opening face, so that the filling material is exclusively located within the cavity.

The known processes are disadvantageous in that they either require relatively high apparatus expenditure in order to produce a coextruded product and/or require complicated working steps, such as e.g. the stripping of openings of the hollow mouldings.

The problem of the invention is to provide a less complicated and costly process according to the preamble enabling large quantities to be produced.

BRIEF SUMMARY OF THE INVENTION

According to the invention this problem is solved by a process for the production of filled food hollow mouldings, in which each hollow moulding has at least one cavity, which is open to the environment and filled with a filling material solid at ambient temperature and having a cross-sectional dimension between approximately 0.25 mm$^2$ and approximately 1cm$^2$, characterized in that in a first stage the hollow mouldings are coated at reduced pressure with the filling material, a filling material coating temperature being set in such a way that the filling material is flowable and in which in a second step the pressure is raised, so that the flowable coating material enters the cavities.

It is possible to spray on the filling material. It is possible to use a water-containing and/or fat-containing and/or protein-containing filling material.

The coating temperature can between 30° C. and 98° C., preferably 60° C.

The hollow mouldings can be produced by extrusion and can be hollow cylindrical.

The hollow mouldings can be produced from a porous material. Prior to the first step the hollow mouldings can be vacuum-coated with coating material. Additionally, prior to the first step and in particular prior to vacuum coating, the hollow mouldings can be dried under reduced pressure.

The hollow mouldings can have cavities, which are open to the environment with one and/or several end portions.

The coating temperature is approximately set in such a way that the resulting filling material viscosity leads to the filling material advancing to the greatest possible extent into the cavities of the hollow mouldings. Preferably the filling material completely fills the cavities.

In a particularly appropriate embodiment in the first step such a filling material quantity is used that after the second step there is essentially no filling material outside the cavities on the hollow mouldings.

Preferably of hollow mouldings are simultaneously filled in a mixing vessel or filled hollow mouldings are produced, the hollow mouldings being stirred or mixed during the first and/or second step.

After the second step, the filled hollow mouldings can be coated with a covering material containing colouring and/or flavouring substances.

BRIEF DESCRIPTION OF THE DRAWINGS

The invention is described in greater detail hereinafter relative to an embodiment and the attached drawings, wherein show.

DETAILED DESCRIPTION OF THE INVENTION

Figure 1:
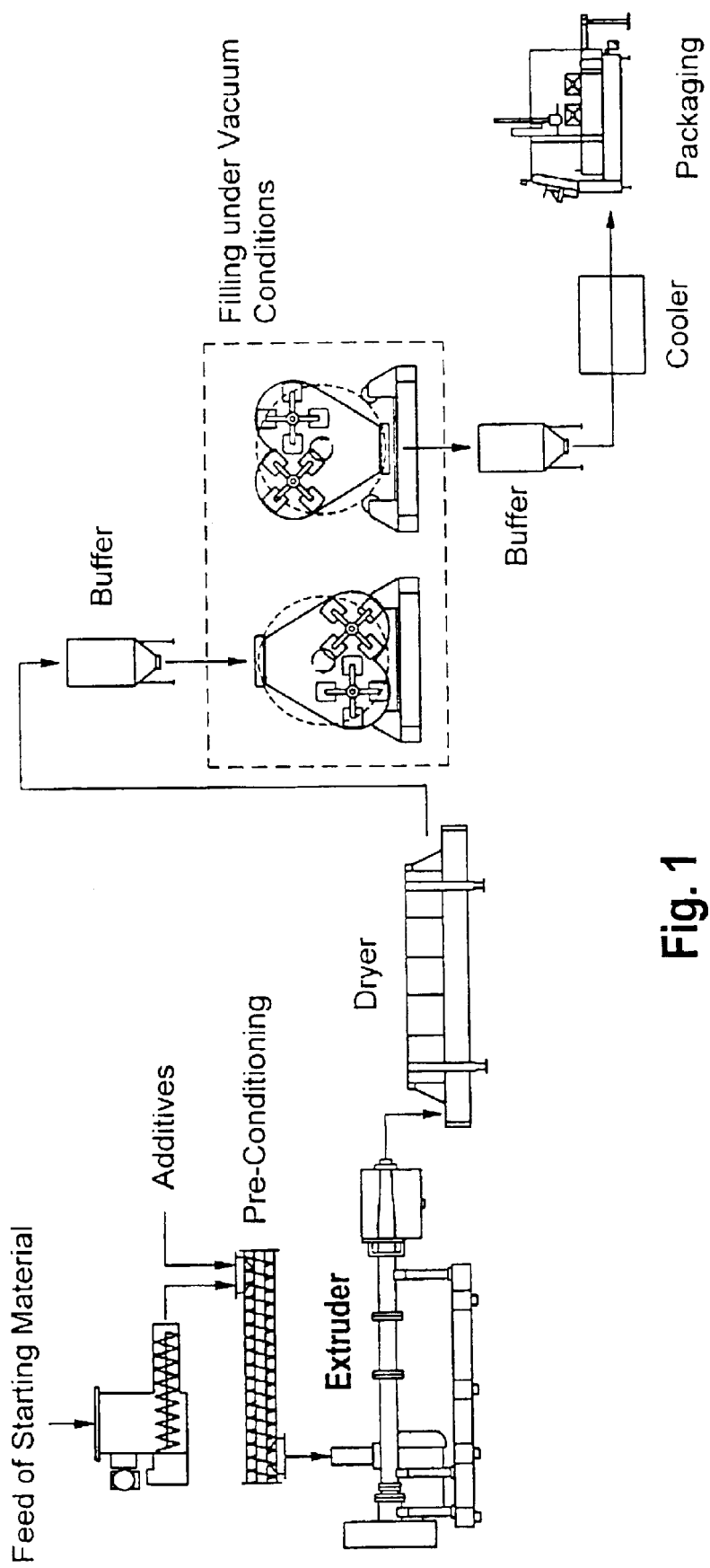
FIG. 1 A simplified plant diagram for performing the process according to the invention.

FIG. 1 diagrammatically shows a plant for performing the inventive process for the production of filled food hollow mouldings, a starting material being preconditioned following the addition of additives such as fat, water, etc. and is extruded in an extruder to a desired cross-sectional shape, consideration e.g. being given to the production of a hollow cylindrical cross-section. In a typical situation, directly upstream of the extruder mouth the extruded material has a temperature of approximately 125° C. and a moisture content of 25%. Following comminution of the extruded, strand-like material to a desired length of e.g. 1 cm, the thus produced hollow mouldings enter a dryer where they are e.g. dried for 30 minutes at 140° C. (product temperature approximately 95° C.) to a moisture content of 6% and are conveyed into a temporary storage means.

Fundamentally there can be a random size, shape and number of cavities per hollow moulding and apart from a hollow cylindrical construction random other embodiments are possible, such as e.g. mouldings having several cylindrical or also conically tapering openings, in which the openings are parallel to one another or pass in different directions. In the manner of blind holes, the cavities can terminate blind in the hollow moulding and several hollow mouldings can be interconnected. All that is important is that each basic or hollow moulding provided with one or more cavities has a certain capacity for receiving a filling material flowable in a processing state and which is subsequently solid at ambient temperature. In addition, the openings or cavities must be sufficiently large to be clearly visible with the naked eye, i.e. the cross-sectional dimension should be at least approximately 0.25 mm², which corresponds to a diameter of approximately 0.5 mm. The maximum appropriate diameter for such openings or cavities is approximately 1 cm² or a diameter of approximately 1 cm, in the case of cavities with a circular cross-section.

Figure 3:
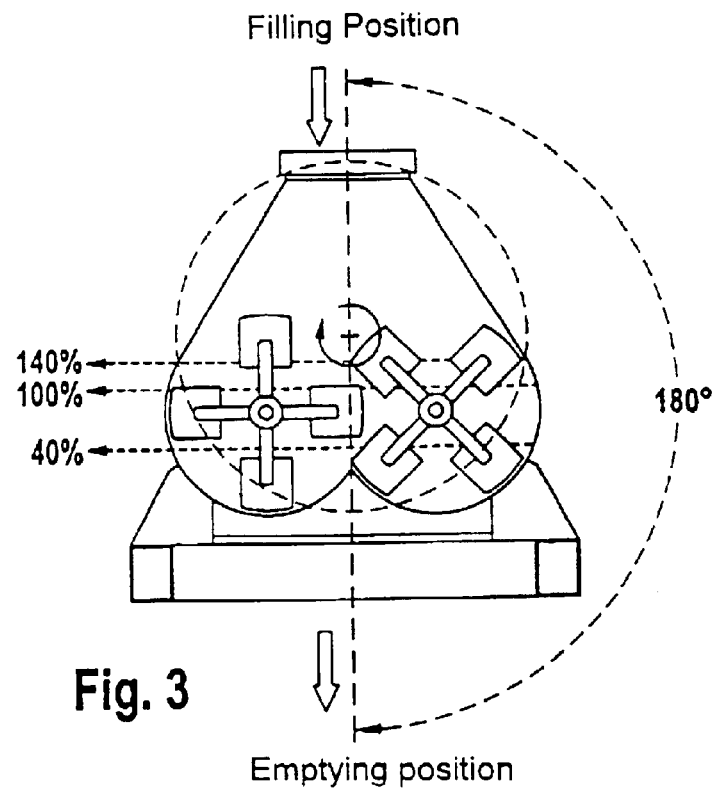
FIG. 3 A per se known vacuum coating device.

The filling or coating process according to the invention takes place in a per se known pivotable vacuum mixer or coater, which is shown in FIG. 3. As can be gathered from FIGS. 1 and 3, the vacuum mixer has a mixing vessel with mixing blades rotatable about a horizontal swivel axis and a sealable filling or emptying opening facing the same. By pivoting by 180° the mixer is brought from the filling and working position into an emptying position.

Following the introduction of a desired quantity of food hollow mouldings to be filled and taken as bulk material from the temporary storage means, the mixer is sealed and the pressure within the mixer reduced to approximately 200 mbar. The desired filling material, e.g. a material containing fat and/or water and/or protein is sprayed onto the hollow mouldings, the filling material temperature being set in such a way that the material is in the form of a flowable cream. The material can e.g. have a temperature of approximately 60° C. This temperature to be set can also be dependent on the temperature of the hollow mouldings located in the mixer and the mixing ratio between the filing material and the hollow mouldings, because following contact between the filling material and the hollow mouldings a joint temperature is set, which can differ from the temperature with which the filling material must have a viscosity such that it flows or is forced into the cavities of the hollow mouldings and preferably substantially or completely fills the same.

When all the filling material has been sprayed into the mixer and the hollow mouldings are uniformly coated with the material as a result of the mixing process, the filling material still being located on the outer face of the hollow mouldings, the pressure inside the mixer is gradually raised again to ambient pressure. It has surprisingly been found that the filling material originally more or less uniformly distributed on the outer surface of the hollow moulding is substantially exclusively and completely forced or flows into the cavities of the hollow mouldings.

Figure 2:
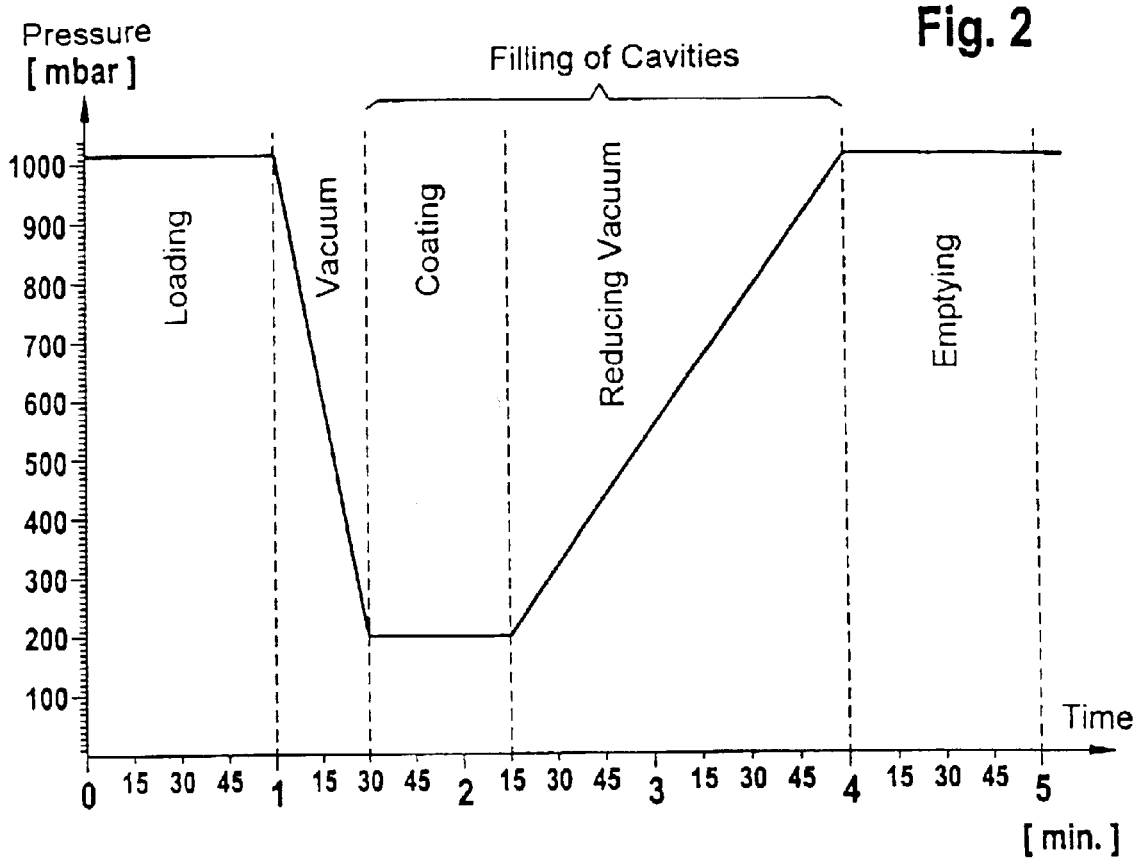
FIG. 2 Temperature and pressure gradients during the individual process steps in a vacuum coating device, as used in the plant according to FIG. 1.

FIG. 2 illustrates the above-described coating process by means of the time pressure gradient within the mixer.

When using a porous material for producing the basic or hollow mouldings to be filled, the pores of the material can be filled in a preceding step with an e.g. fat-containing coating material, working appropriately taking place in the vacuum coating process. Instead of drying the extruded hollow mouldings in a separate dryer, the drying operation can be directly performed in the mixer, optionally with an energy supply (heat) from the outside, in that prior to the coating process the pressure within the mixer is lowered well below 200 mbar, e.g. to 40 mbar, which corresponds to a boiling point of approximately 30° C. (in the case of aqueous filling materials) and leads to a relatively rapid drying and cooling.

What is claimed is:

1. Process for the production of filled food hollow mouldings, comprising the steps of:

providing at least one hollow moulding having at least one cavity, which is open to the environment and can be filled with a filling material solid at ambient temperature, said cavity having a cross-sectional dimension between approximately 0.25 mm² and approximately 1 cm²;

a first step of coating the hollow mouldings under a reduced pressure with the filling material, wherein a filling material coating temperature is set in such a way tat the filling material is a flowable cream; and a second step of raising the pressure so that the flowable coating material enters the cavities.

2. Process according to claim 1, wherein the filling material is sprayed on.

3. Process according to claim 1, wherein use is made of a filling material containing water and/or fat and/or protein.

4. Process according to claim 1, wherein the coating temperature is between 30 and 98° C.

5. Process according to claim 1, wherein the pressure is reduced to 200 mbar.

6. Process according to claim 1, wherein the hollow mouldings are produced by extrusion.

7. Process according to claim 1, wherein the cavities of the hollow mouldings are cylindrical in shape.

8. Process according to claim 1, wherein the hollow mouldings are produced from a porous material.

9. Process according to claim 1, wherein prior to the first step, the hollow moulding are vacuum-coated with a coating material.

10. Process according to claim 1, wherein prior to the first step, the hollow mouldings are dried under reduced pressure.

11. Process according to claim 1, wherein the hollow mouldings have cavities, which awe open to the environment from at least one end portion.

12. Process according to claim 1, wherein the coating temperature is set in such a way that the resulting filling material viscosity allows the filling material to substantially advance into the cavities of the hollow mouldings.

13. Process according to claim 1, wherein the filling material completely fills the cavities.

14. Process according to claim 1, wherein a filling material quantity is used in the first step-such that following the second step there is substantially no further filling material outside the cavities on the hollow mouldings.

15. Process according to claim 1, wherein a plurality of filled hollow mouldings is simultaneously produced in a mixing vessel, the hollow mouldings being stirred during the fist and/or second step.

16. Process according to claim 1, further including a step following the second step, wherein the filled hollow moulding are coated with a covering material containing colouring and/or flavouring substances.

17. Process according to claim 1, wherein an animal food is produced.

18. Process according to claim 4, wherein the coating temperature is 60° C.

19. Process according to claim 1, wherein he hollow mouldings have cavities which are open to the environment from several end portions.

* * * * *